United States Patent
Oosthof

(10) Patent No.: US 7,123,163 B2
(45) Date of Patent: Oct. 17, 2006

(54) SYSTEM FOR MEASURING A PARAMETER WITHIN A CLOSED ENVIRONMENT

(75) Inventor: Johannes Hendrik Jacob Oosthof, Rockanje (NL)

(73) Assignee: J & M Holding B.V., Rockanje (NL)

( * ) Notice: Subject to any disclaimer, the term of this patent is extended or adjusted under 35 U.S.C. 154(b) by 427 days.

(21) Appl. No.: 10/149,908

(22) PCT Filed: Dec. 18, 2000

(86) PCT No.: PCT/NL00/00926

§ 371 (c)(1),
(2), (4) Date: Oct. 24, 2002

(87) PCT Pub. No.: WO01/44758

PCT Pub. Date: Jun. 21, 2001

(65) Prior Publication Data

US 2003/0132856 A1    Jul. 17, 2003

(30) Foreign Application Priority Data

Dec. 17, 1999    (NL) .................................... 1013884

(51) Int. Cl.
*G08C 19/00*    (2006.01)
(52) U.S. Cl. .............................. 340/870.07; 340/870.02
(58) Field of Classification Search .......... 340/870.02, 340/870.19, 870.18, 445, 447, 10.41, 10.1, 340/542; 73/146.5; 324/157
See application file for complete search history.

(56) References Cited

U.S. PATENT DOCUMENTS 5,298,894 A * 3/1994 Cerny et al. ............ 340/870.02
6,611,198 B1 * 8/2003 Geiszler et al. .......... 340/10.41
6,629,046 B1 * 9/2003 Bond et al. ................... 702/61

FOREIGN PATENT DOCUMENTS

EP    0 563 713 A    10/1993

\* cited by examiner

*Primary Examiner*—Wendy R. Garber
*Assistant Examiner*—Hung Q Dang
(74) *Attorney, Agent, or Firm*—Young & Thompson

(57) ABSTRACT

System for measuring a parameter within a closed surrounding, which system includes an apparatus containing a sensor for sensing the parameter and for delivering a sensor signal related to the parameter; an electronic circuit for processing the sensor signal into a measurement value; a transponder, connected to the electronic circuit, which transponder after reception of an external activation signal activates the electronic circuit and the sensor and thereafter transmits the measurement value supplied by the measuring circuit, the system including furthermore a scanning unit for generating and transmitting the activation signal and for receiving the transmitted measurement value whereby the apparatus furthermore contains a housing in which the sensor, the electronic circuit and the transponder are installed, the housing having normalised connecting part for connecting the housing to the closed surrounding and for enabling the sensor to sense the parameter, the housing being otherwise hermetically closed such that the transponder is able to transmit and receive signals in the above described manner.

4 Claims, 2 Drawing Sheets

SYSTEM FOR MEASURING A PARAMETER WITHIN A CLOSED ENVIRONMENT

BACKGROUND OF THE INVENTION

The invention relates to a system for measuring a parameter within a closed surrounding, which system comprises and apparatus containing:

a sensor for sensing said parameter and for delivering a sensor signal related to said parameter, an electronic circuit for processing said sensor signal into a measurement value, a transponder, connected to said electronic circuit, which transponder after reception of an external activation signal activates the electronic circuit and the sensor and thereafter transmits the measurement value supplied by the measuring circuit, a scanning unit for generating and transmitting said activation signal and for receiving said transmitted measurement value, and a housing in which the sensor, the electronic circuit and the transponder are installed.

A system of this type is known from EP-0,563,713. This prior art system is especially destined to measure a parameter in a closed environment such as the pressure inside the tube. The actual measuring system is contained in a closed package obtained by molding all the various components into a suitable encapsulating material. The housing does not have any connecting means at the outside because all communication with the circuit inside the housing is done through the antenna. The housing can be made very small and can be mounted very easily within a tire or vehicle to measure the pressure inside or mounted within a moving section of a vehicle shock absorber to sense accelerations experienced by the shock absorber as the vehicle to which the shock absorber is mounted travels over a rough road.

A further prior art system is known from U.S. Pat. No. 5,298,894. This prior art system is especially destined to measure a parameter of the fluid in a buried conduit. A part of the conduit is removed and replaced by a housing comprising the sensor and eventually electronics for amplifying the parameter dependent signal delivered by said sensor. This housing is located into a metal subsurface pit enclosure which is closed by a metal pit lid. A transponder is installed into a further housing which is integrated into the pit lid such that the antenna of the transponder is located outside the metal lid to ensure proper functioning thereof.

Other apparatuses for various parameter are for instance embodied as pressure transmitter for measuring pressure, temperature transmitters for measuring temperature, flow meters for measuring flow in gasses or fluids, pH meters for measuring the acidity of gasses or fluids, conductivity meters, viscosity meters etc. In these known apparatuses the electronic circuit supplies a signal to two external connecting terminals. After installation of the apparatus at the location where the measurements have to be carried out these connecting terminals are through cables connected with for instance a display which may form part of a monitoring panel or with a processor for the processing for the measuring signals. The cables could have a significant length. In this manner a number of parameters derived from different locations within a plant, such as temperature, pressure, conductivity, flow, pH etc., can be monitored remotely and preferably at a central location within a plant where each parameter is measured by a separate device.

In many cases it is not necessary to remotely measure and/or monitor a parameter continuously. In many cases it is sufficient to monitor the respective parameter with certain intervals whether or not on a regular basis. In that kind of applications in general one will not use an apparatus comprising a sensor and an electronic circuit but one will use an independently functioning manometer, temperature meter, flowmeter etc. These independently functioning instruments do not have a cable connection to a central post and are therefore often relatively cheap if there are bought. When performing monitoring operations with these independently working measurement instruments in general the measured value during a monitoring operation will be written down or registered in another way and thereafter the collected stored measurement values will be processed any further, for instance by inputting them to a computer. This procedure is rather cumbersome and the invention has now has the object to indicate in which way the writing down of measurement values can be eliminated and the further processing of the measurement values can be automated or at least significantly simplified. A further object of the invention is to provide meters which use transponder technology and can easily replace existing meters which do not use transponder technology.

SUMMARY OF THE INVENTION

Said object is fulfilled in a system as mentioned in the first paragraph in that the housing has normalized connecting means for connecting the housing to said closed surrounding and for enabling said sensor to sense said parameter, said housing being otherwise hermetically closed such that the transponder is able to transmit and receive signals in the above described manner.

By making use of transponder technology during monitoring of a measurement apparatus simply the scanning unit is activated so that the measurement apparatus becomes active for a short while, forms a measurement value and transmits this value back to the scanning unit where the measurement value is stored. Human reading of the measurement value from the meter is therewith eliminated. The scanning unit may have a display onto which the measurement value can be made visible for direct checking and interpretation. On the other hand (or simultaneously) the measurement value can be stored in an electronic memory and can be read therefrom easily and can be transferred for further processing.

With the invention a number of advantages are obtained. The measurement is performed with an instrument without moving parts and therefore without wear or mechanical malfunctioning so that a high reliability can be obtained. The coupling between the sensor and the medium to be measured can be embodied in general simply and robust and at the end of his life cycle the whole instrument can be demolished easily and can be recycled for the larger part. The meter according to the invention can be used to replace an existing meter without the necessity to make any mechanical alterations. The existing meter is removed by operating the standerdised connecting means and the meter according to the invention is installed in the same manner by operating the standerdised connecting means.

It is remarked that the application of transponder technology for measuring pressures is already known, for instance from EP0505906. Described therein is a pressure sensor which together with a transponder is built into a vehicle-tire to measure the therein reigning pressure. Through the transponder the measured value is transferred to a display which for instance is positioned within view of the driver of the vehicle. This embodiment however is completely unsuited to function as replacement of an "ordinary" manometer, temperature meter etc.

Above it is only indicated that the sensor signal is processed to be transmitted by the transponder. As such transponder circuits functioning with analogue modulation of the transmitting frequency are conceivable. However, referring for instance to the accuracy and the insensitivity for defects it is preferred that the transmission frequency is modulated in a digital manner. The system respectively the apparatus according to the invention has the characteristic that the electronic circuit comprises an AD-converter for generating a digital pulse series out of the analogue sensor signal.

It is furthermore preferred that not only the electronic circuit but also the sensor is mounted inside the housing and that the coupling and/or connecting means are connected to or forming part of the housing. It is especially preferred that the housing and the coupling and/or connecting means are embodied such that the apparatus without alterations to the closed environment can replace a common meter. If in an existing situation use is made of a mechanical manometer which is connected through a standardised coupling to a conduit in which the pressure has to be measured, then within the scope of the invention it is preferred that the coupling and/or connecting means will fit to the standardised coupling part of the conduit coupling.

In special cases it may be necessary to install a cable of restricted length between the sensor and the electronics on the one hand and the transponder on the other hand. That is for instance the case if the measurements have to be performed on a conduit which is burried into the ground. The sensor can be mounted onto said conduit, but for a proper communication it will be necessary that the transponder is located at earth level or higher, so that a short cable between the transponder and the combination of sensor and electronic circuit is necessary.

It is possible to measure a large number of different parameters with such measurement apparatuses, such as flow, pH, conductivity, humidity etc. Especially however the system is very suited for measuring pressure or temperature.

Pressure and temperature meters are used in large numbers in the chemical industry. If a measurement apparatus according to the invention is applied in a more or less aggressive surroundings then it is preferred that the housing and the coupling and/or connecting means are made of a chemically inert material, for instance stainless steel.

In general it is preferred to transfer as much power as possible through the scanning unit to the transponder such, that not only the components necessary for the actual measurement but also other components (eventually for a short time) can be activated. In that respect it is preferred that the transponder comprises an active or passive charge storage device (a rechargeable battery respectively a capacitor with relatively large capacity) with sufficient storage capacity to activate not only said sensor, electronic circuit and transponder but also a further circuit at least for a short while. The transponder may comprise also a separate power unit which receives energy at a separate frequency. As such all these transponder and other types are known and do not require further explanation. Any type of transponder can be used for realising the invention.

An example of a further circuit is a display panel which is mounted in the housing in such a manner that the panel is visible from the outside. If now the scanning unit transfers an activation signal to the measuring apparatus then not only the measuring value will be formed by the sensor and the respective electronics and will be transferred back to the scanning unit, but the measurement will also for a short while be visible on the display screen. The advantage thereof is that in case a measurement value is transferred which is clearly outside the normal range of measurement values, this fact will be directly visible so that direct action can be undertaken.

It is furthermore preferred that a further circuit consists of a code generator for generating a code which is transmitted each time in combination with a measuring value. Therewith it is possible to provide each measuring apparatus with its own code so that always a unique combination of a code and a measuring value is received in the scanning unit.

BRIEF DESCRIPTION OF THE DRAWINGS

The invention will now be explained in more detail with reference to the attached drawings.

DESCRIPTION OF THE PREFERRED EMBODIMENTS

Figure 1:
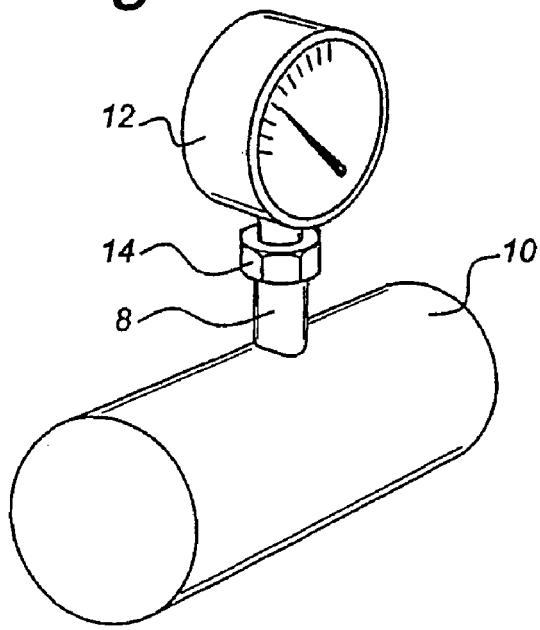
FIG. 1 illustrates an application of a well-known pressure gauge, temperature gauge or similar apparatus with hand indication.

FIG. 1 illustrates the well-known application of for instance a pressure gauge or temperature gauge for measuring the pressure respectively temperature within a tube 10. The tube 10 comprises a connecting piece 8, onto which through a swivel 14 a measuring instrument can be screwed.

In the embodiment of FIG. 1 this measuring instrument comprises a temperature gauge or pressure gauge referenced by the reference number 12. The pressure gauge may have a construction which is known as such and comprises a hand indicator. If it comes to a temperature gauge then also the construction thereof is considered as known. Such gauges are commercially available and are applied widely. The connection between the connecting piece 8 and the actual gauge 12 can be realised that in various manners. A swivel 14 is only one example thereof. As such various standardised elements for such connections are widely available and are widely applied.

Figure 2:
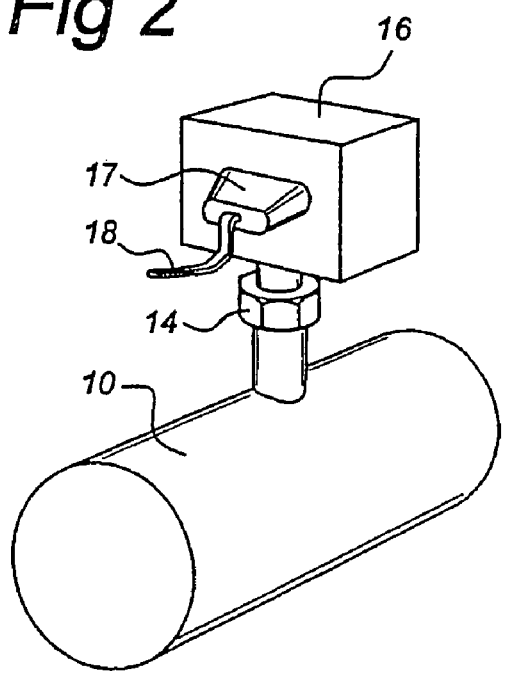
FIG. 2 illustrates an application of a well-known pressure transmitter or temperature transmitter or similar apparatus.

FIG. 2 illustrates an embodiment of a measuring transmitter 16, which is known as such and which is mounted on the same connecting piece 8 of the tube 10 by means of a similar swivel 14. This measuring transmitter does not have a readable scale. The measuring transmitter comprises a measuring sensor for measuring the pressure respectively temperature or another measurable parameter, a converter for converting the measuring signal into a value suitable for transmission and an eventual driver amplifier which offers this signal from the connector 17 to a multiwire conduit 18. The purpose of this multiwire conduit 18 is on the one hand to supply sufficient energy to the measuring sensor 16 so that this sensor may function properly and on the other hand to supply the converted and eventually amplified signal to for instance a display which can be mounted remotely into a control panel, or to supply this signal for instance to a processor for the processing of the signal. The advantage of such a measuring transmitter is that no readings have to be taken. Such transmitters are widely applied at those locations where it is not easy to read the gauge whereas on the other hand it is desired to have a measuring value constantly available.

Figure 3:
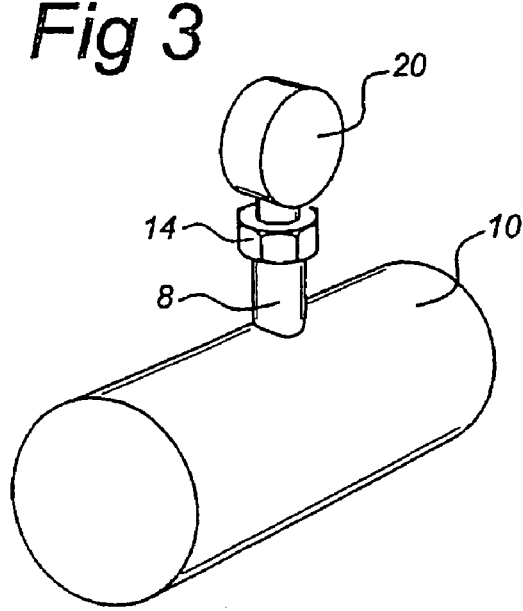
FIG. 3 illustrates the application of an apparatus according to the invention.
Figure 5:
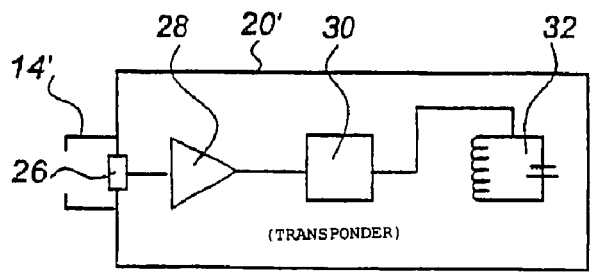
FIG. 5 illustrates the electric circuitry corresponding to the embodiment of FIG. 3.

In situations where it is not necessary or even undesired to read a meter, continuously or not, but an occasional reading is preferred and whereby furthermore, for whatever reason, it is not desired to apply a measuring transmitter, a system according to the invention can be applied. This system comprises an apparatus as illustrated in FIG. 3. Just as in the embodiments illustrated in FIGS. 1 and 2 the apparatus 20 is connected to a connecting piece 8, extending from the tube 10 by means of a swivel or another well-known coupling unit. Inside the apparatus 20 there is a circuit which is schematically illustrated in FIG. 5. The apparatus 20 comprises a sensor 26 for measuring for instance the pressure, temperature or another parameter of the fluid within the tube 10. The sensor is mounted such that said sensor through the coupling means, indicated by 14', can come into contact with the fluid present within the tube 10 respectively in the connecting piece 8. It will be clear that the construction is such that the fluid within the tube 10 respectively within the connecting piece 8 cannot enter the inside of the apparatus 20 to avoid contact between the electronic circuit and the fluid. It is remarked that the term "fluid" covers both fluids as well as gasses including air.

The output signal of the sensor 26 is supplied to an amplifier/converter 28 in which the signal is amplified and eventually normalised and preferably digitised. The output signal of this amplifier 28 is supplied to the transponder circuit 30, which at its input/output is combined with an L/C circuit 32.

As such transponder circuits are known and the functioning thereof will be considered as known to the expert in this field. The functioning of a possible embodiment can be summarised as follows. From an external source a high frequency signal, the frequency of which corresponds to the tuning frequency of the LC-circuit 32, is applied to the apparatus 20. The LC-circuit 32 is in resonance on that frequency and provides a current to the actual transponder circuit 30. An energy storage element embodied as a passive capacitor or eventually an active accumulator is present within this transponder circuit. If an active accumulator is used then this accumulator is in any case positioned and mounted within the apparatus such that there is a fixed connection with the other components of the transponder and cannot be exchanged. This capacitor or accumulator will be charged with the received high frequent energy after rectifying said energy. As soon as sufficient charge is received this component starts functioning as power source for activating the transponder circuit 30 for a short time to transmit the digitalized value, received from the amplifier 28, in general in combination with an identity or code characteristic, through the LC-circuit 32 such that this signal can be received by an external receiver.

Figure 7:
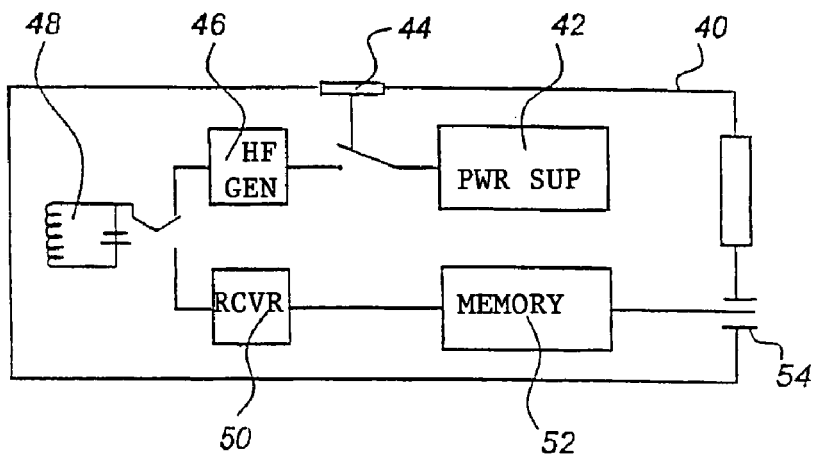
FIG. 7 illustrates as example a possible electric circuitry for a scanning station.

The transmitter circuit which supplies the high frequency energy to the LC-circuit 32 and the receiver circuit, which receives the measuring value transmitted by the LC-circuit in combination with the identification, are combined into one scanning unit of which the electrical circuitry is schematically illustrated in FIG. 7.

The scanning unit in the shown embodiment is packed into a housing 40 of which the dimensions are such that the scanning unit can be hand held easily. In the scanning unit 40 there is a power supply 42 of sufficient capacity. After activating a start button 44 by the user of the unit first of all the generator 46 will be activated for supplying a high frequency signal at the frequency onto which the LC-circuit 32 in the apparatus 48 is tuned. That is the same frequency as the frequency onto which the LC-circuit 32 in the apparatus 20 is tuned. The signal transmitted by the circuit 48 is received in the transponder and is used therein to charge the charge storage unit as is indicated above. After a predetermined time period the connection between the power source 42 and the generator 46 is interrupted. The power source 42 is coupled to the receiver 50 and to the memory 52. The circuit is embodied such that the input of the receiver 50 is now connected to the LC-circuit 48, whereas the output of the receiver 50 is now connected to the memory 52. The circuit is now embodied such that the input of the receiver 50 is connected to the LC-circuit 48, whereas the output of the receiver 50 is connected to the memory 52.

As soon as the charging process in the transponder 30 is finished the digitised measuring value, received from sensor 26, will be transmitted together with the identification code. This combination of measurement value and code is received through the LC-circuit 48 and the receiver 50 and transferred to the memory 52 in which the combination is stored. Therewith the scanning cycle is finished and the user of the scanning unit may proceed to a next apparatus 20 to read this apparatus. It will be clear that the scanning unit comprises electronics which take care that a next combination of measurement value and identification code will be stored in a next empty position in the memory 52.

Figure 8:
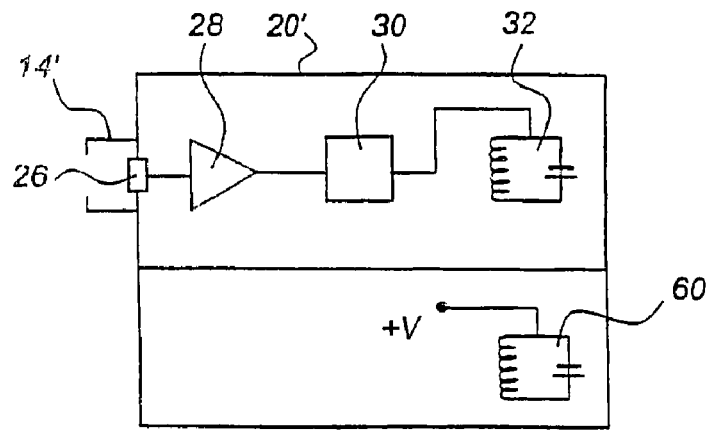
FIG. 8 illustrates schematically another embodiment of a transponder.

Instead of a transponder of the above-described type another transponder can be used in which a separate receiving circuit is present for receiving the powering energy. A schematic illustration thereof is shown in FIG. 8. The transmission circuit is identical to that in FIG. 5 and therefore corresponding reference numbers are used for corresponding components. Added to this circuitry is a separate LC-circuit indicated by 60, through which powering energy is received at another frequency than the frequency which is used by the LC-circuit 32 for transmitting the measuring value. As long as energy is transmitted at the correct frequency the circuit 60 will build up a voltage +V which can be used as powering energy for the components within the frame 20'. Also such transponders are known as such and do not need further explanation. It is indicated again that in fact any type of transponder can be used without infringing the inventive basic idea which is formulated in the attached claims.

At the end of a reading out trip around various meters in this manner a number of combinations of measurement value and corresponding identification code are stored in the memory 52. The memory 52 can be coupled now through a coupling 54 to a suitable processor or CPU, which reads the memory and processes the therein stored data.

Figure 4:
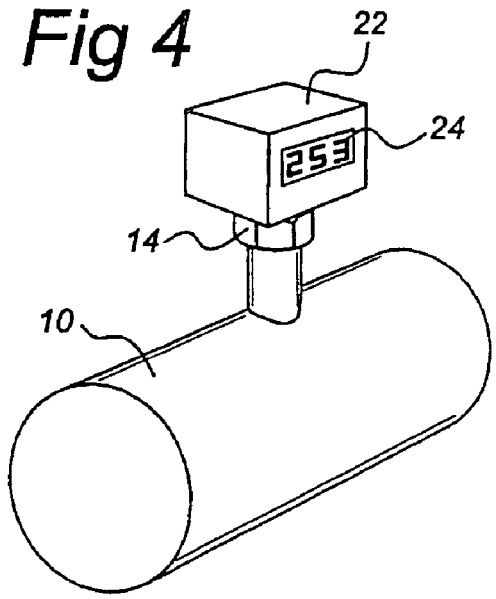
FIG. 4 illustrates the further development of an apparatus according to the invention.
Figure 6:
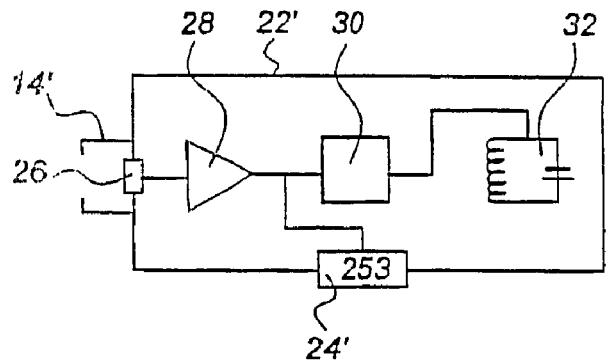
FIG. 6 illustrates the electric circuitry corresponding to the embodiment of FIG. 4.

An eventual further embodiment of the invention is illustrated in FIG. 4 and the corresponding electrical diagram is illustrated in FIG. 6. The essential difference between FIGS. 3 and 4 is that in FIG. 4 an additional display 24 is present. In the non-active situation this display 24 is non-active and it is therefore not possible to read a measurement value thereon. If the unit 22 is activated by a scanning unit then in this case a charge storage device within the transponder 30 is charged in a sufficient manner to be able to carry out the whole transmitting process and also to activate for a short time the indication unit 24'. The user of the scanning unit is therewith, eventually able to check if there is a measurement value within a common range. In this case scanning units can be used without memory, which units are exclusively destined to activate the apparatus 22 for a short time and to read a measurement value. As soon as the charge storage device in the apparatus is empty the whole apparatus will switch to non-active. The housing in the example of FIG. 4 is rectangular but in fact the shape and dimensions of the housing, apart from the coupling means 14, are not subjected to any restrictions.

One of the advantages of an apparatus according to FIGS. 3 or 4 is that there is not any current in the apparatus as long as there is no activating signal so that electric sparks are excluded. In many surroundings this is a stringent condition.

It is taken for granted above that the transponder unit together with the sensor is directly coupled to the tube, the barrel, the boiler, etc. of which the pressure, the temperature etc. has to be measured. In some cases however this could lead to an unworkable situation. Suppose that the pressure has to be used in a tube which runs underground or is for instance embedded into a wall etc. In that case it is preferred to mount the sensor and eventually the transmitter by means of which the sensor signal is brought to a reasonable level, adjacent to or inside the tube, whereas the actual transponder circuit is connected therewith through a cable such that the transponder can be installed at a suitable position where it can be reached easily by the signals of the scanning station. If for instance the tube is one meter under earth level then the transponder may be positioned at the surface and connected by cable to the sensor which is installed in or adjacent to the tube.

The invention claimed is:

1. System for measuring a parameter within a closed surrounding, which system comprises an apparatus containing:
   a sensor for sensing said parameter and for delivering a sensor signal related to said parameter;
   an electronic circuit for processing said sensor signal into a measurement value;
   a transponder, connected to said electronic circuit, which transponder after reception of an external activation signal activates the electronic circuit and the sensor and thereafter transmits the measurement value supplied by the measuring circuit;
   a scanning unit for generating and transmitting said activation signal and for receiving said transmitted measurement value; and
   a housing in which the sensor, the electronic circuit and the transponder are installed,
   wherein the housing and the coupling and/or connecting means are embodied such that the apparatus, without alterations to the closed surrounding, replaces a meter that measures the parameter.

2. System according to claim 1, wherein the housing and the coupling and/or connecting means are fabricated from a chemically inert material.

3. System according to claim 1, wherein the apparatus comprises a display panel which is mounted inside the housing in such a manner that the panel is visible from the outside.

4. System according to claim 1, wherein the apparatus comprises a code generator which is able to generate a code which is transmitted each time in combination with the measurement value.

* * * * *